United States Patent [19]

Barton, Jr.

[11] E Re. 31,250

[45] Reissued May 24, 1983

[54] SLOT LOADED, LOW PROFILE MAGNETIC TAPE DRIVE

[75] Inventor: William M. Barton, Jr., San Diego, Calif.

[73] Assignee: Cipher Data Products, Inc., San Diego, Calif.

[21] Appl. No.: 320,852

[22] Filed: Nov. 13, 1981

Related U.S. Patent Documents

Reissue of:

[64] Patent No.: 4,236,682
Issued: Dec. 2, 1980
Appl. No.: 66,792
Filed: Aug. 15, 1979

[51] Int. Cl.[3] ..... G03B 1/04; G11B 15/32

[52] U.S. Cl. ..... 242/198

[58] Field of Search ..... 242/198–204, 242/182; 360/85, 92–96.5, 132; 352/157, 158; 226/91, 92

[56] References Cited

U.S. PATENT DOCUMENTS

| | | | |
|---|---|---|---|
| 3,395,871 | 8/1968 | Ackermann et al. | 242/198 |
| 3,617,650 | 11/1971 | Morello | 179/100 |
| 3,620,479 | 11/1971 | Umeda | 242/198 |
| 3,863,863 | 2/1975 | Ende | 242/182 |
| 3,904,149 | 9/1975 | Suzuki | 242/198 |
| 3,910,526 | 10/1975 | Mosciatti | 242/182 |
| 4,159,812 | 7/1979 | Cary | 242/192 |

FOREIGN PATENT DOCUMENTS

| | | |
|---|---|---|
| 1524865 | of 1970 | Fed. Rep. of Germany . |
| 7516892 | of 1975 | Fed. Rep. of Germany . |
| 7923038 | of 1979 | Fed. Rep. of Germany . |
| 53-138706 | of 1978 | Japan . |
| 1171706 | of 1969 | United Kingdom . |

OTHER PUBLICATIONS

"Die Technik des antomatischen Einfadelns von Magnetbandern in Bangeraten der Datenverarbeitung", 1976.

*Primary Examiner*—Leonard D. Christian
*Attorney, Agent, or Firm*—Brown & Martin

[57] ABSTRACT

A magnetic tape drive unit constructed in a horizontal configuration to fit in a drawer or similar low profile installation, the tape being loaded and unloaded through a front slot without the need for access to the mechanism. A supply reel is inserted in the slot and placed on a supply hub, the free end of the tape being applied to a take-up reel which has a vacuum action to retain the tape. The take-up reel is mounted on an arm which swings back in the enclosure and pulls the tape over a guide and head array, the supply reel being simultaneously retracted so that the tape and reels are fully enclosed. After rewinding, the arm swings back and the supply hub is extended to the slot for removal of the tape.

21 Claims, 18 Drawing Figures

SLOT LOADED, LOW PROFILE MAGNETIC TAPE DRIVE

Matter enclosed in heavy brackets [ ] appears in the original patent but forms no part of this reissue specification; matter printed in italics indicates the additions made by reissue.

BACKGROUND OF THE INVENTION

Open reel type magnetic tape drive, such as used in computers and data processing equipment, are usually installed in a generally upright position, the reels and the head assembly being exposed for access. The tape supply reel is normally secured on one driven hub and the tape is threaded through the head assembly and attached to the take-up reel. Since the reels and head assembly are exposed, their design is usually made attractive in appearance by means of trim, covers and other cosmetic features, which add to the cost of the apparatus. In many installations the mechanism is protected by doors, which are often transparent, leaving the mechanism exposed and thus subject to esthetic treatment.

The upright tape drive units require a considerable amount of space and limit the packaging arrangement in many instances. It would be advantageous to have a tape drive unit which would fit into a minimum of space, be easy to load and unload and be concealed in use so as not to require cosmetic trim.

SUMMARY OF THE INVENTION

The tape drive unit described herein is constructed horizontally to fit into a drawer, or other low profile enclosure. The only access is through a front slot, in which the edge portions of a supply hub and a take-up reel, which grips the tape by vacuum until the first turn or two are wound up. When the starting sequence is initiated, the take-up reel is swung to the rear of the unit on an arm, which action pulls the tape across a guide and head array, so eliminating the need for threading the tape. At the same time the supply hub is retracted and the supply reel is secured on the hub by cam actuated clamps.

The supply hub and take-up reel have individual drive motors, but the arm movement and the supply hub retraction are accomplished by a single actuating motor. All of the actuating mechanism is fully enclosed, but is readily accessible for servicing by opening the drawer.

The primary object of this invention, therefore, is to provide a new and improved magnetic tape drive unit.

Another object of this invention is to provide a tape drive unit which is installed horizontally in a drawer and is loaded and unloaded through a front slot.

Another object of this invention is to provide a tape drive unit which is concealed in use and requires a minimum of access for operation.

A further object of this invention is to provide a tape drive unit which is adaptable to standard tape reels, read/write means and control operations.

Other objects and advantages will be apparent in the following detailed description, taken in conjunction with the accompanying drawings, in which.

DESCRIPTION OF THE PREFERRED EMBODIMENT

Figure 1:
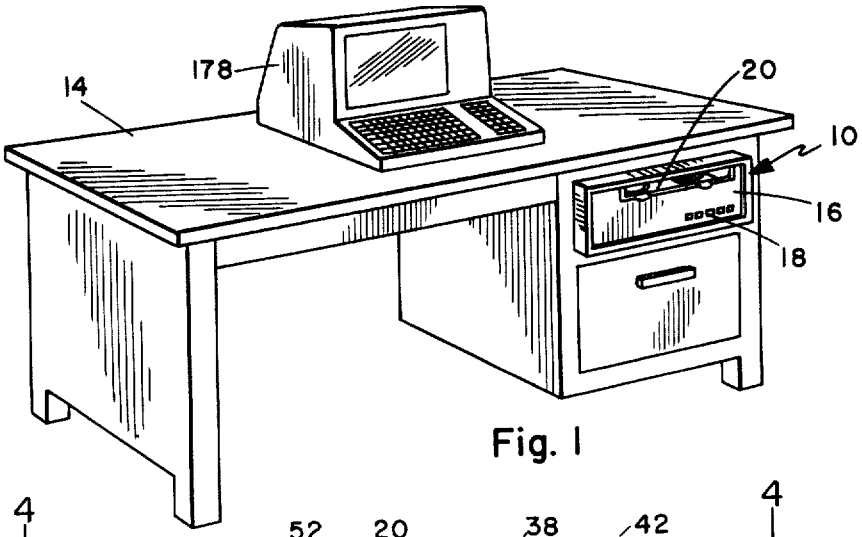
FIG. 1 is a pictorial view of a typical desk with the tape drive unit installed in a drawer.
Figure 2:
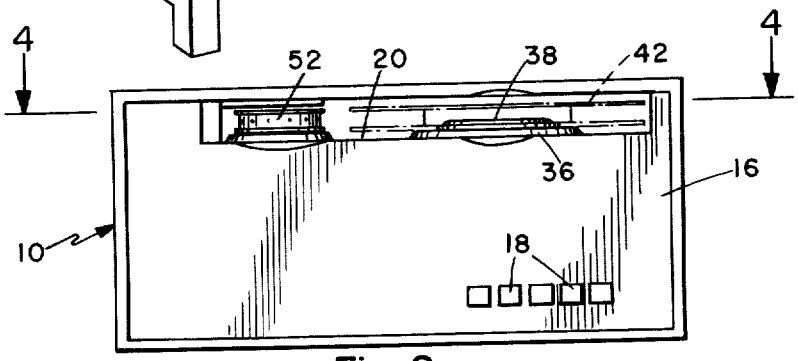
FIG. 2 is a front elevation view of the tape drive unit.

The tape drive unit 10 is contained in a housing 12 constructed as a drawer, which can be installed in a desk 14 with any conventional arrangement of slides or guides, not shown. The housing has a front panel 16 in which the usual controls 18 are mounted, the upper portion of the front panel having a horizontal access slot 20 through which the tape is loaded and unloaded. Since the front panel is the only portion of the unit normally visible, it alone may be made attractive in appearance as desired. The drawer need not be opened except for servicing the mechanism when needed.

The specific structure of the housing is not critical, but in the arrangement illustrated all of the mechanism is mounted on a rigid base plate 22, secured in the housing just below the level of slot 20. Housing 12 may have a removable top cover 24 for access to the reels and head assembly, which are on top of base plate 22, all of the actuating mechanism being below the base plate clear of the tape path.

In the front right hand portion of base plate 22 is a rearwardly extending opening 26, along the sides of which are rails 28 fixed below the base plate. A mounting plate 30 is slidably mounted between rails 28 to move from front to rear. Suitable bearings could be used between rails 28 and plate 30 to reduce friction. Secured below mounting plate 30 is a motor 32 having an upwardly extending drive shaft 34, on which is a supply hub 36. The supply hub 36 has a raised central boss 38 to fit the opening 40 of a tape supply reel 42 and supports the reel parallel to and above the base plate 22.

To the rear of opening 26 is a post 44 projecting below base plate 22 and pivotally mounted on the post is an arm 46. On the outer end of arm 46 is a take-up motor 48 coupled by a belt drive 50 to a take-up reel 52, which is rotatable on a support shaft 54 mounted in a bracket 56 on the arm. Take-up reel 52 projects above base plate 22 through an arcuate slot 58 having its center of radius at post 44. Slot 58 extends from near the front to the rear portion of the base plate. In the forward position of arm 46, the take-up reel 52 is at the front of the unit alongside supply hub 36 and accessible through slot 20. In the rear position of arm 46, the take-up reel 52 is positioned above a raised circular platform 60 on the rear portion of the base plate, as indicated in broken line in FIG. 4.

Figure 4:
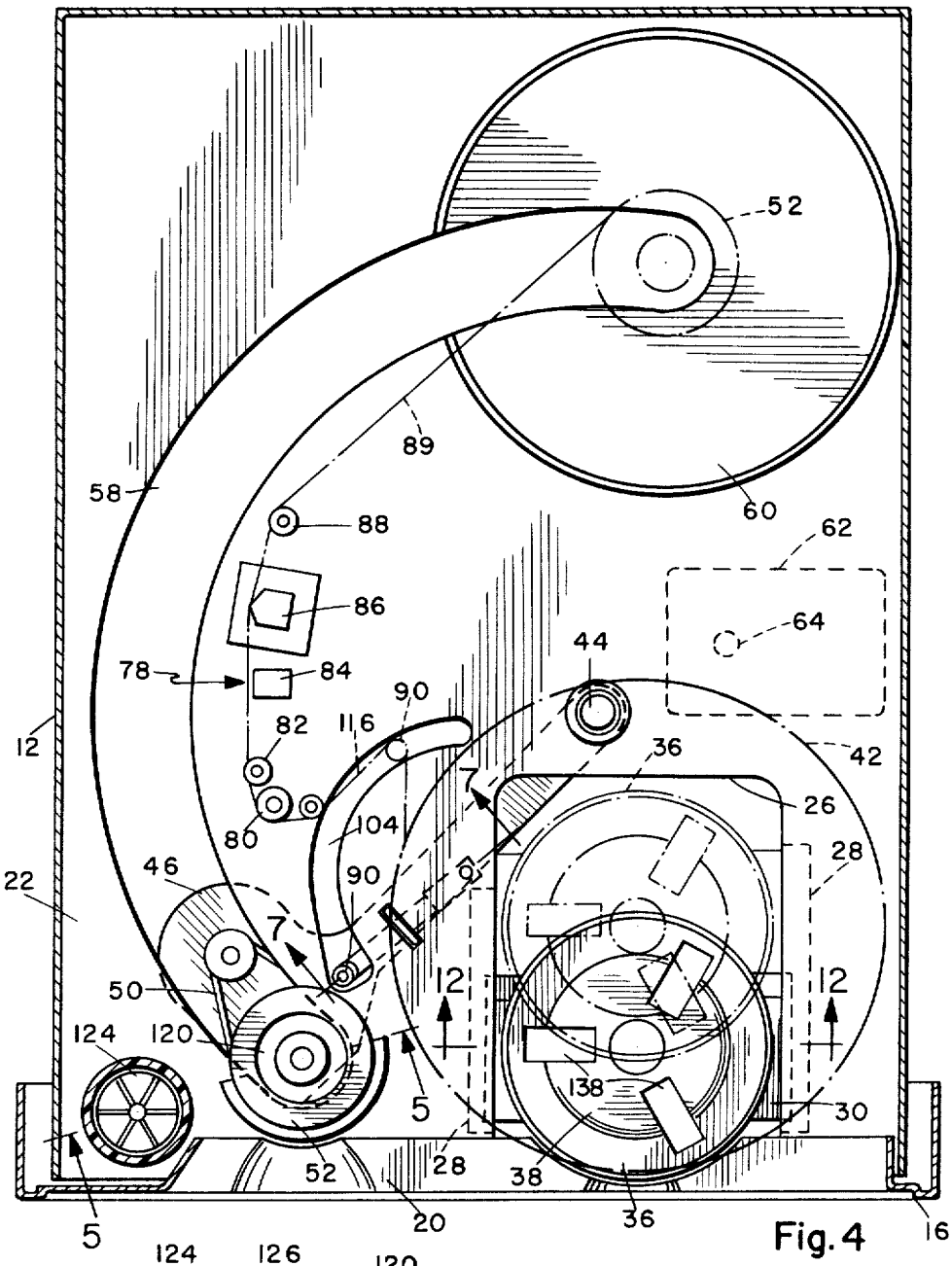
FIG. 4 is an enlarged sectional view taken along line 4—4 of FIG. 2.
Figure 9:
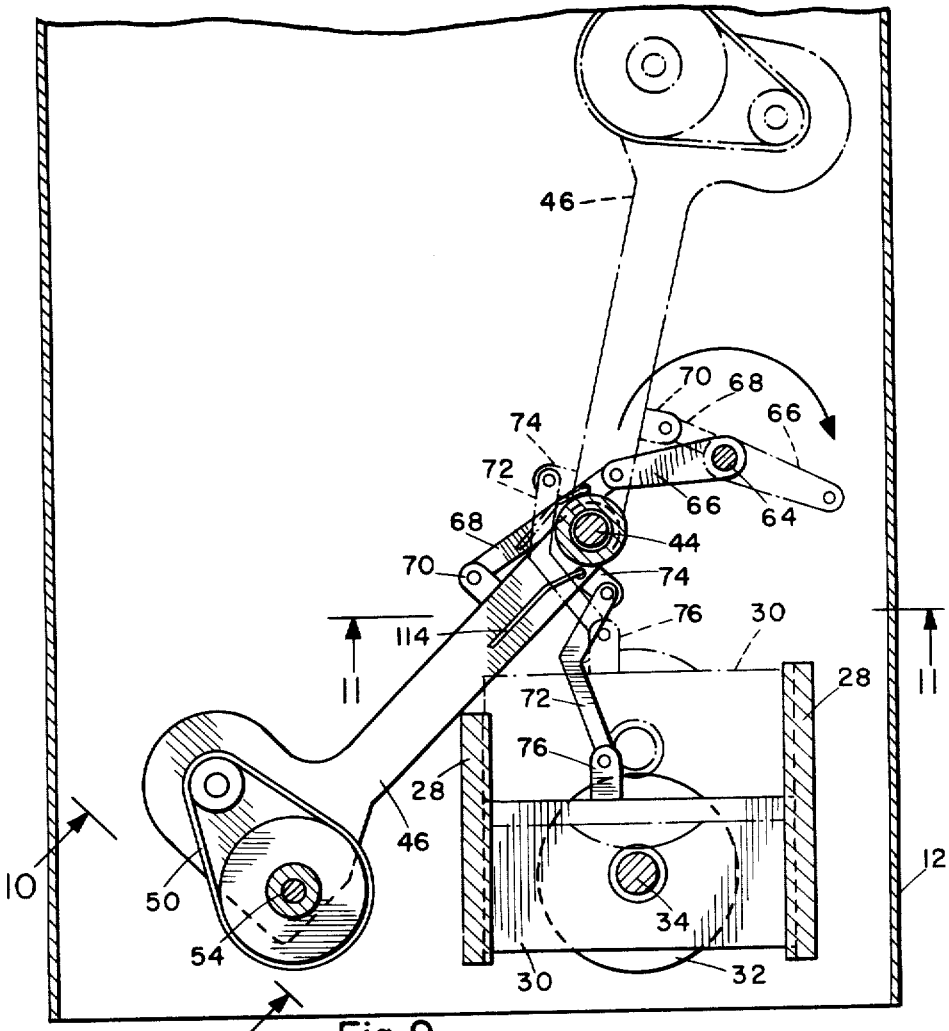
FIG. 9 is a sectional view taken along line 9—9 of FIG. 6.
Figure 10:
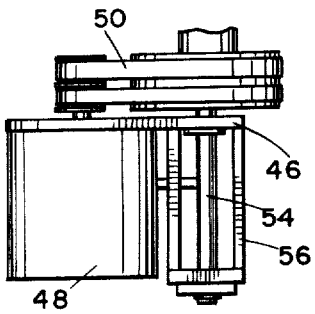
FIG. 10 is a view taken along line 10—10 of FIG. 9.
Figure 11:
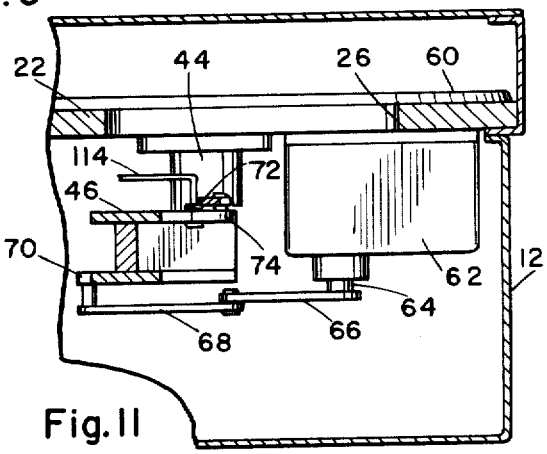
FIG. 11 is a sectional view taken along line 11—11 of FIG. 9.

The arm 46 is operated by an actuating motor 62 mounted under base plate 22 adjacent post 44, the actuating motor having a drive shaft 64 carrying a crank 66. A link 68 couples the crank 66 to a lug 70 on arm 46. As illustrated in FIG. 9, rotation of shaft 64 pulls arm 46 from the forward, full line position to the rear, broken line position. The actuating motor 62, shown in FIGS. 4 and 11, is omitted from FIG. 9 for clarity. The supply hub 36 is retracted or pulled rearwardly as arm 46 moves to the rear position and is moved forward when the arm swings forward. This is accomplished by a tie bar 72 pivotally connected between a lug 74 on arm 46 and a lug 76 on the rear edge of mounting plate 30. The two positions of this linkage are also indicated in FIG. 9.

Mounted on top of base plate 22 along the inner edge of slot 58 is a tape utilization head assembly 78, over which the tape passes. The head assembly comprises, from the front, a tachometer 80, which is coupled to a suitable readout to show the amount of tape advanced, a guide roller 82, an optical sensor 84 to detect end of tape markings, a read/write head 86 and a guide roller 88.

As described later, the tape 89 is stretched across the head assembly 78 when the arm 46 swings to the rear. To maintain tension in the tape, a tension roller 90 is brought into engagement with the tape after it is extended over the head assembly. Since the tension roller must be clear of the tape path during loading and unloading it is retracted and extended by linkage coupled to arm 46.

Figure 7:
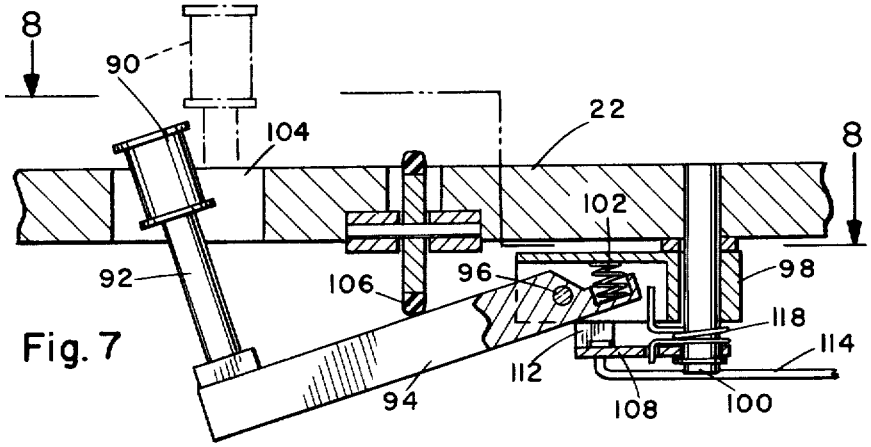
FIG. 7 is an enlarged sectional view taken along line 7—7 of FIG. 4.
Figure 8:
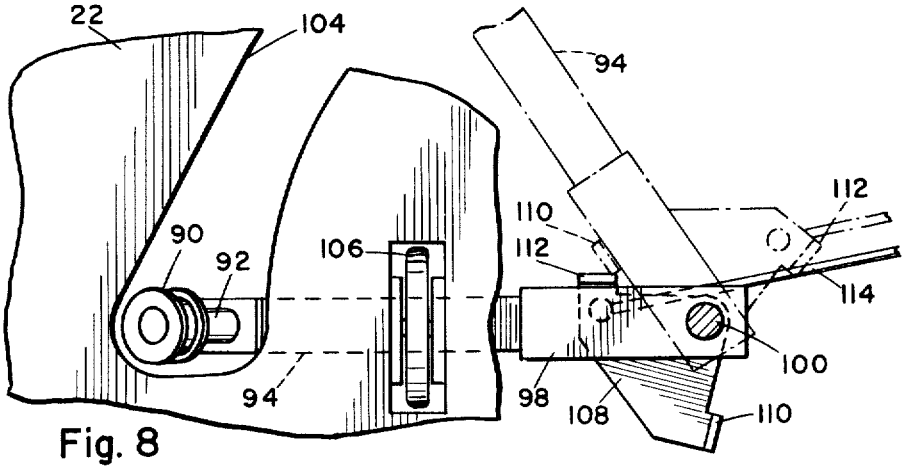
FIG. 8 is a sectional view taken along line 8—8 of FIG. 7.

As illustrated in FIGS. 7 and 8, the tension roller 90 is rotatably mounted on a post 92 at the end of a support arm 94, which is pivoted on a horizontal pin 96 in a bracket 98. The bracket 98 is rotatable on a post 100 projecting vertically downward from base plate 22, so that the bracket and support arm can swing horizontally and the support arm can pivot vertically in the bracket. A lifting spring 102 between bracket 98 and the support arm 94 biases the support arm upwardly. The tension roller 90 and its supporting post 92 project above base plate 22 through an arcuate slot 104, centered on post 100 and can move from a forward retracted position indicated in full line in FIG. 4, to a rearward tension position indicated in broken line. The tension roller is retracted below the tape path in the forward position by a roller cam 106 mounted on base plate 22 to engage and depress support arm 94, as in FIG. 7.

Since the tension roller must not be raised until after the tape has passed and must be retracted before the tape is unloaded, a lost motion linkage is used to couple the tension roller to arm 46. A generally triangular link plate 108 is pivotally mounted on post 100 below bracket 98 and has upwardly projecting fingers 110 and 112 at opposite corners. The fingers are spaced apart to allow the link plate to have a limited range of rotation between engagements of the fingers with opposite sides of bracket 98. A connecting rod 114 connects the link plate 108 to arm 46. In the forward position of arm 46, finger 110 holds the bracket 98 in place with support arm 94 depressed under roller cam 106, as in the full line position in FIGS. 7 and 8. When arm 46 swings rearwardly, connecting rod 114 pulls link plate 108 back, but there is no movement of bracket 98. When the arm 46 has travelled far enough to extend the tape beyond the start of the head assembly, finger 112 engages bracket rearwardly, as in the broken line position. Support arm 94 rides off roller cam 106 and spring 102 lifts the support arm and tension roller 90 up into the tape path. Continued motion of arm 46 pulls the tension roller into engagement with the tape 89 and pulls an offset loop 116 into the tape, as in FIG. 4. A torsion spring 118 installed between link plate 108 and bracket 98 provides the tensioning force. Forward movement of arm 46 will, of course, reverse the action by swinging link plate 108 until finger 110 engages bracket 98 and retracts the tension roller.

Figure 5:
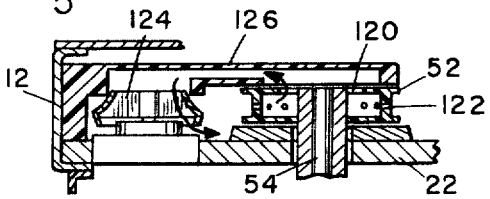
FIG. 5 is a sectional view taken along line 5—5 of FIG. 4.
Figure 6:
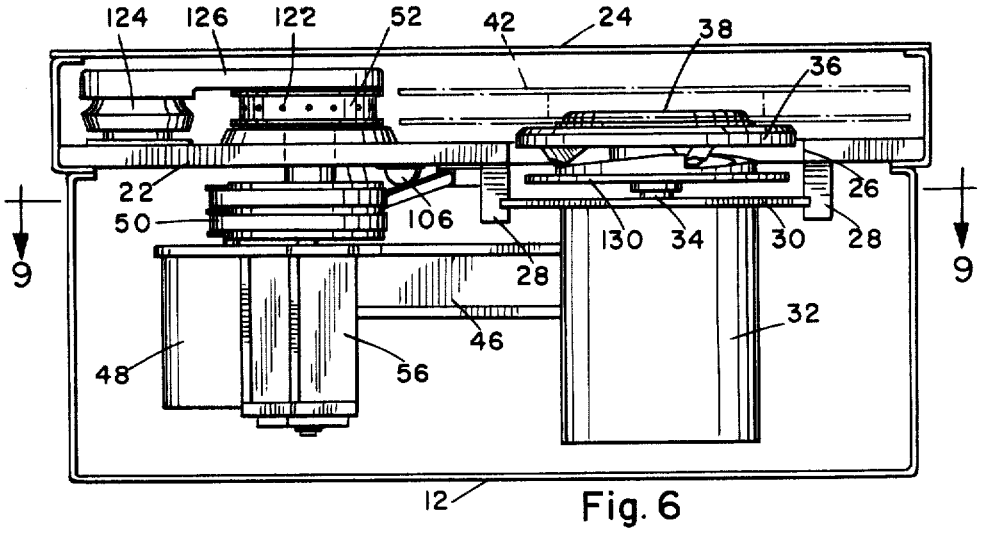
FIG. 6 is an enlarged front elevation view of the drive unit with the front cover removed.

To simplify tape loading the take-up reel 52 is provided with vacuum retaining means to hold the end of the tape in place during the first few turns. As illustrated in FIGS. 4 and 5, the take-up reel 52 has an open top 120 and peripheral perforations 122. A small blower 124, mounted at the side of the take-up reel, is coupled by a hood 126 to the open top 120 to draw air in through perforations 122, as indicated by the arrows in FIG. 5. Hood 126 is supported with minimum clearance above the take-up reel to allow the reel to move out from under the hood.

Figure 12:
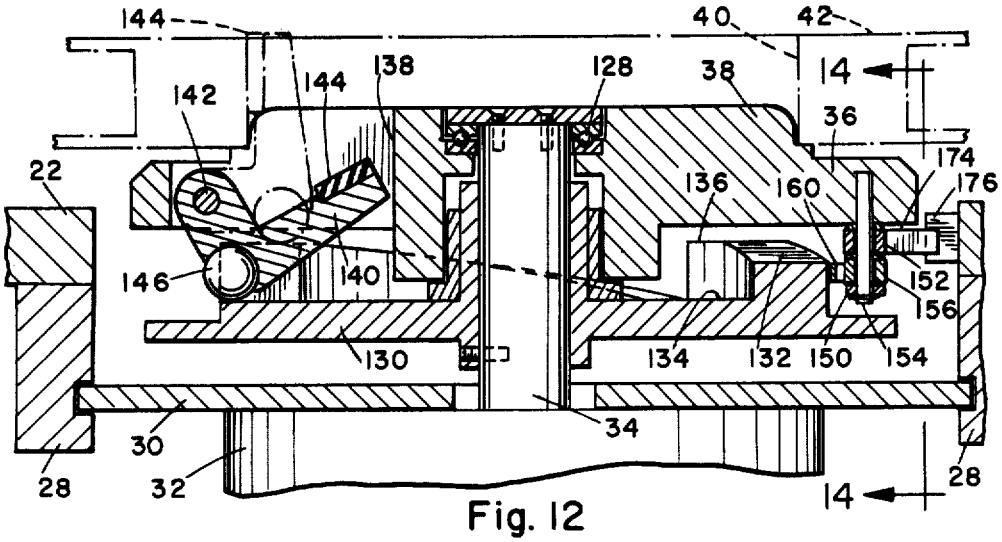
FIG. 12 is an enlarged sectional view taken along line 12—12 of FIG. 4.
Figure 13:
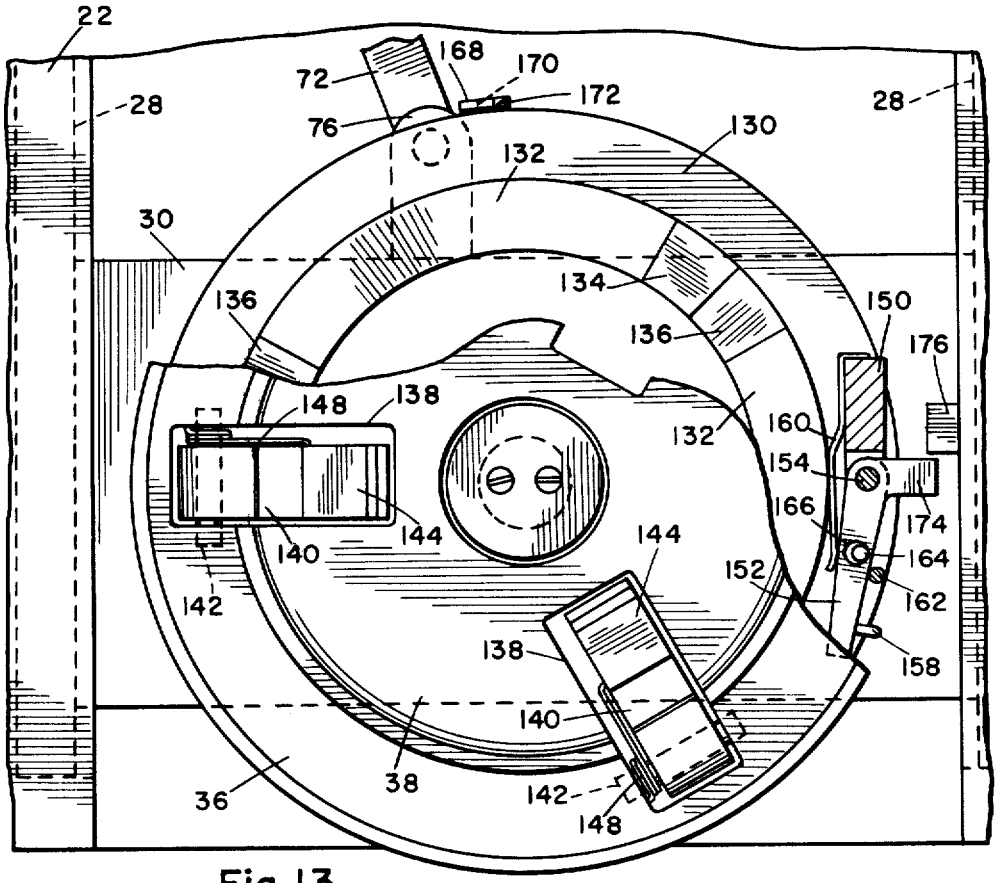
FIG. 13 is a top plane view of the structure of FIG. 12, with portions cut away.
Figure 14:
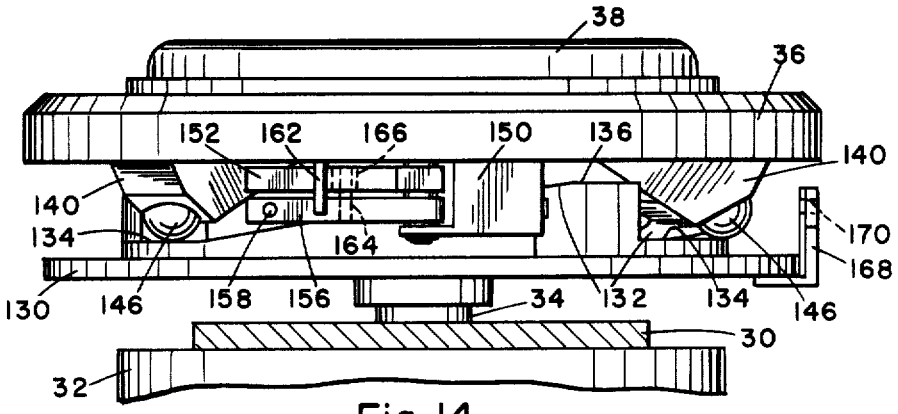
FIG. 14 is a sectional view taken along line 14—14 of FIG. 12.
Figure 15:
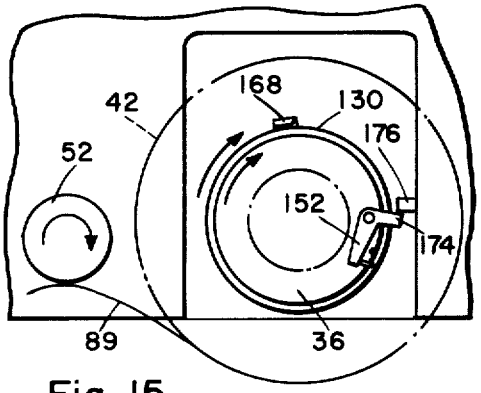
FIGS. 15–18 illustrate diagramatically the loading and unloading sequence of the mechanism.

The supply hub 36 incorporates mechanism for automatically clamping the supply reel 42 in place when loaded, so that a positive drive is established for controlling and subsequently rewinding the tape. As illustrated in FIGS. 12 and 13, supply hub 36 is rotatable on the drive shaft 34 and is held in place by a thrust bearing 128 on the upper end of the drive shaft. Below supply hub 36 is a circular cam plate 130 keyed to rotate with drive shaft 34, and on the upper surface of the cam plate are three circumferential ramp cams 132, each having a lower platform 134 and an upper platform 136.

The supply hub 36 has three equally spaced radial slots 138 and in each slot is mounted a clamp finger 140. The clamp finger is a generally L-shaped element with one end pivoted on a hinge pin 142 at the outer end of the slot 138, to swing upwardly and radially outwardly and project above boss 38. The other end of the clamp finger 140 has a friction pad 144 to engage and grip the inside wall of the central opening 40 in the supply reel, as in the broken line position in FIG. 12. At the apex of the clamp finger 140 is a roller ball 146 which rolls on one of the ramp cams 132.

Each clamp finger 140 is biased downwardly by a spring 148 to keep the roller balls in contact with their respective ramp cams and to keep the clamp fingers normally retracted. In the retracted position the roller balls rest on the lower platforms 134 of the ramp cams. When cam plate 130 rotates relative to the supply hub 36, in the appropriate direction, the roller balls 146 will ride up the ramp cams 132 and raise the clamp fingers 140 to the reel clamping position. Thrust bearing 128 resists the upward load on the supply hub caused by the ramp cam action. When the relative rotation is reversed the clamp fingers will be retracted.

Fixed beneath the periphery of supply hub 36 is a bracket 150 carrying a bellcrank 152 which is pivotal on a vertical hinge pin 154. Below the bellcrank and also pivotal on hinge pin 154 is a latch arm 156 having an outwardly projecting latch pin 158. Latch arm 156 is biased outwardly by a spring 160, so that the latch pin 158 projects beyond the edge of the supply hub. Outward movement of both the bellcrank 152 and the latch arm 156 is limited by a stop pin 162 on the supply hub. Latch arm 156 has a coupling pin 164 which projects upwardly through an oversize hole 166 in the bellcrank 152, to couple the two elements together.

Fixed on the outer edge of cam plate 130 is an upwardly projecting latch bracket 168, having a socket 170 to receive latch pin 158 and an inclined ramp face 172 to lead the pin into the socket. Bellcrank 152 has an outwardly extending stop arm 174 for engagement with a fixed stop 176 on the side of opening 26.

OPERATION

In the initial loading position the supply hub 36 and take-up reel 52 are in the forward position, the clamp fingers 140 are retracted and the blower 124 is operating. The blower can, if desired, be running at all times, since the air can be used to cool the interior of the machine.

Figure 3:
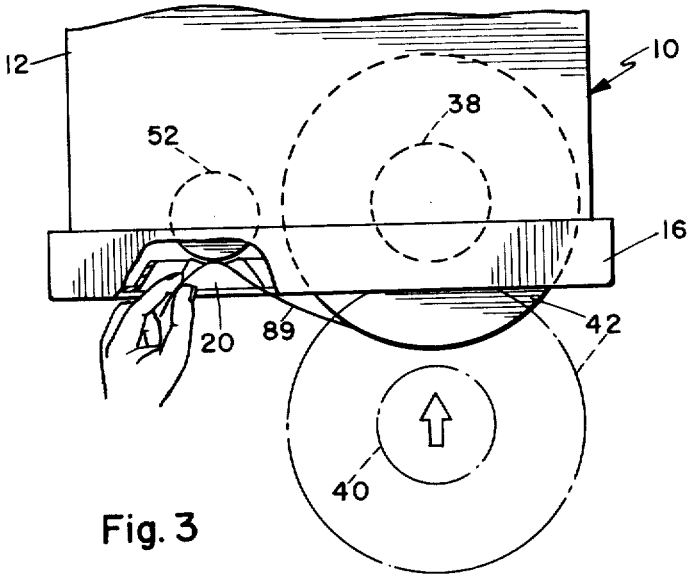
FIG. 3 is a top plan view of the front portion of the tape drive unit, showing the manual tape loading operation.

As shown in FIG. 3, a supply reel 42 is inserted into slot 20 and placed over the boss 38 of the supply hub. The free end of tape 89 is pulled out and placed against take-up reel 52, where it will be held by the vacuum. The machine is then started by the appropriate one of controls 18 to carry out the loading operations. The electrical circuitry for operating the machine is not shown since it involves only simple switching and suitable circuits are well known. The unit can also be controlled through a computer terminal 178, or the like, as indicated in FIG. 1.

Figure 16:
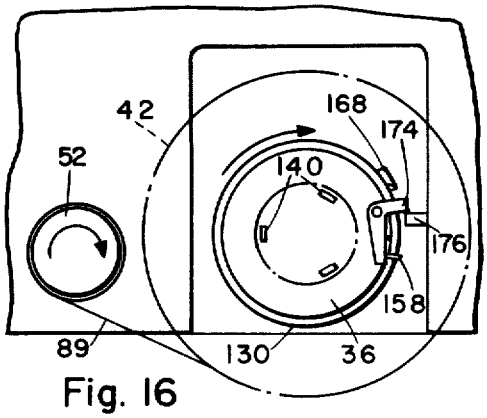

Take-up motor 48 is actuated to wind the tape 89 around take-up reel 52, sufficiently to obtain a driving grip. Motor 32 is also started and carries out the sequence of actions illustrated in FIGS. 15–18. Cam plate 130 is rotated in a clockwise direction and carries supply hub 36 with it, by the frictional coupling of the roller balls 146 on the cam plate. After almost one complete revolution, stop arm 174 strikes the rear of 176 and halts the rotation of supply hub 36. The engagement of the stops also turns bellcrank 152 and extends latch pin 158 outwardly, as in FIG. 16. Cam plate 130 is continuing to turn and latch bracket 168 moves around to engage latch pin 158. The oversize hole 166 allows the latch arm 156 to move back against spring 160, so that the latch pin 158 can ride over ramp face 172 and drop into socket 170, latching the cam plate and supply hub together. Since the stop arm 174 is against stop 176, rotation is impeded. At this point any suitable sensing means can be used, either a position detector at the latch mechanism or a load or resistance detector on motor 32, to initiate the next step.

Figure 17:
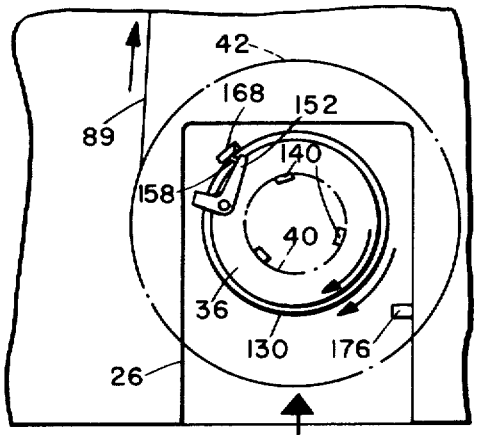
Figure 18:
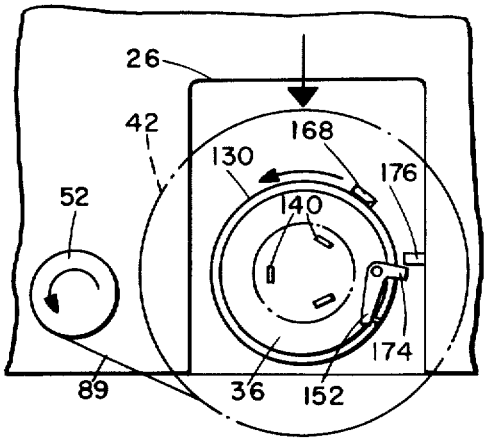

The actuating motor 62 is now started to swing arm 46 to the rear and also pull back the mounting plate 30, which moves the supply hub assembly back away from stop 176, as in FIG. 17, so that rotation can continue. The tape 89 is extended around the head assembly 78, tension roller 90 is raised to engage the tape and the take-up reel 52 stops in the rearmost or operating position, completing the loading operation. The machine is now operable as a conventional tape deck with the appropriate controls. Platform 60 prevents the tape from sagging when wound on the take-up reel 52, but in normal use the tape will be wound tightly enough to stay in flat alignment on the reel.

In the unloading sequence the tape is rewound on the supply reel 42, then actuating motor 62 is operated to swing arm 46 forward and to move the supply hub 36 forward on mounting plate 30. Motor 32 is operated to rotate the cam plate 130 counter-clockwise, as in FIG. 18, until stop arm 174 strikes the front of stop 176. This stops rotation of the supply hub 36, so that continued rotation of the cam plate allows the roller balls 146 to ride down the ramp cams 132 and retract the clamp fingers 140. Supply reel 42 can now be removed from the boss 38 and the mechanism is left in the initial loading position for subsequent use.

The tape drive unit is thus operable without opening the drawer and with access only through the front slot 20. In operation, the tape and the mechanism are completely enclosed and protected. The actuating mechanism is simple and easy to service and is in a compact configuration which can be installed in a minimum of space.

Having described my invention, I claim:

1. A magnetic tape drive unit, comprising;

a housing having a base plate secured substantially horizontally therein;

said base plate having a front portion with a supply hub mounted thereon for receiving a supply reel of tape;

a tape take-up reel having support means mounted on said plate;

actuating means coupled to said support means to move said take-up reel between a loading position at the side of the supply hub and an operating position at the rear of the housing;

a tape utilization assembly including at least a tape reading head mounted on said base plate between the loading and operating positions of the take-up reel, to receive the tape thereon as the take-up reel moves from the loading position to the operating position;

and drive means connected to said supply hub and take-up reel for selective rotation thereof.

2. A magnetic tape drive unit according to claim 1, wherein said housing has a front panel with an access slot positioned to expose the supply hub and the take-up reel in the loading position.

3. A magnetic tape drive unit according to claim 1, wherein said support means comprises an arm pivotally mounted on said base plate to swing generally parallel thereto, said take-up reel being rotatably mounted on said arm, spaced from the pivot thereof.

4. A magnetic tape drive unit according to claim 3, wherein said arm is below said base plate, the base plate having an arcuate slot with a center of radius at the pivotal axis of said arm, said take-up reel being above the base plate and having a supporting shaft extending through said arcuate slot.

5. A magnetic tape drive unit according to claim 4, wherein said drive means includes a take-up motor attached to said arm and coupled to said take-up reel.

6. A magnetic tape drive unit according to claim 4, wherein said tape utilization assembly is on top of said base plate adjacent the inner edge of said arcuate slot.

7. A magnetic tape drive unit according to claim 4, and including a mounting plate slidably mounted on said base plate to move from front to rear thereon, said supply hub being rotatably supported on said mounting plate in horizontal alignment with the take-up reel;

said actuating means being connected to said mounting plate to move the supply hub rearwardly simultaneously with said arm.

8. A magnetic tape drive unit according to claim 7, and including a tension roller for engaging and holding a tensioning loop in the tape, said tension roller being linked to said arm to engage the tape after the motion of the arm has carried the tape beyond the engagement position.

9. A magnetic tape drive unit according to claim 1, and including a source of vacuum connected to said take-up reel to hold the tape thereon.

10. A magnetic tape drive unit according to claim 7, wherein said drive means includes a motor attached to said mounting plate and having a drive shaft on which said supply hub is secured;

said supply hub having a central raised boss to receive a tape supply reel thereon;

and clamp means on said supply hub for securing a tape supply reel thereto.

11. A magnetic tape drive unit according to claim 10, wherein said clamp means includes a plurality of reel engaging clamp fingers mounted in and normally retracted into said supply hub, and actuating means for selectively extending and retracting the clamp fingers.

12. A magnetic tape drive unit according to claim 11, wherein said supply hub is rotatable on said drive shaft;

said clamp finger actuating means including a cam plate fixed on the drive shaft with cams thereon for engaging the clamp fingers and extending and retracting the clamp fingers by relative rotation of the cam plate and the supply hub;

and stop means on said supply hub for selectively retarding rotation in either direction.

13. A magnetic tape drive unit according to claim 12, and including latch means on said supply hub and cam plate for selectively latching the supply hub to the cam plate for rotation therewith.

14. A magnetic tape drive unit according to claim 13, wherein said supply hub has radial slots, said clamp fingers being pivotally mounted in the slots to swing upwardly and outwardly to the reel engaging position.

15. A magnetic tape drive unit according to claim 14, wherein said cams are circumferentially extending inclined ramp elements, each engaging a clamp finger offset from the pivot thereof.

16. A magnetic tape drive unit according to claim 7, wherein said housing is a drawer structure.

17. A magnetic tape drive unit according to claim 16, wherein said housing has a front panel with a horizontally extending slot therein above the level of said base plate and through which said supply hub and said take-up reel are accessible in the loading position.

*18. A magnetic tape drive comprising:*

*a housing;*

*a take-up hub;*

*means for rotatably supporting the take-up hub within the housing;*

*means for rotatably supporting an unencased supply reel within the housing, the supply reel having a length of magnetic tape wound therearound;*

*a tape utilization head assembly mounted within the housing between the supply reel supporting means and the take-up hub;*

*a panel connected to the housing and having an access slot sized and positioned so that the unencased supply reel having the length of magnetic tape wound therearound can be inserted through the slot and engaged by the supply reel supporting means; and*

*means for threading a free end of the length of magnetic tape from the unencased supply reel past the tape utilization head assembly.*

*19. A magnetic tape drive according to claim 18 wherein the housing is a drawer structure.*

*20. A magnetic tape drive according to claim 18 and further comprising a plurality of controls mounted on the panel.*

*21. A magnetic tape drive according to claim 18 wherein the supply reel supporting means includes a supply hub having a raised central boss for facilitating the placement of the supply reel over the supply hub.*

* * * * *